April 21, 1931.  L. E. LA BRIE  1,801,748
BRAKING SYSTEM
Filed Aug. 24, 1925  3 Sheets-Sheet 1
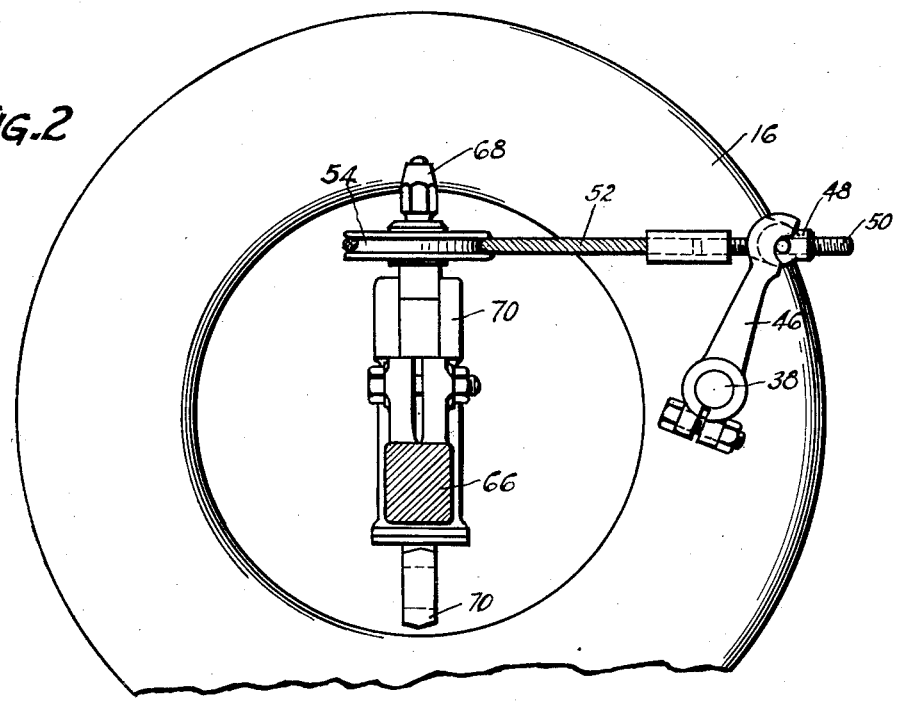
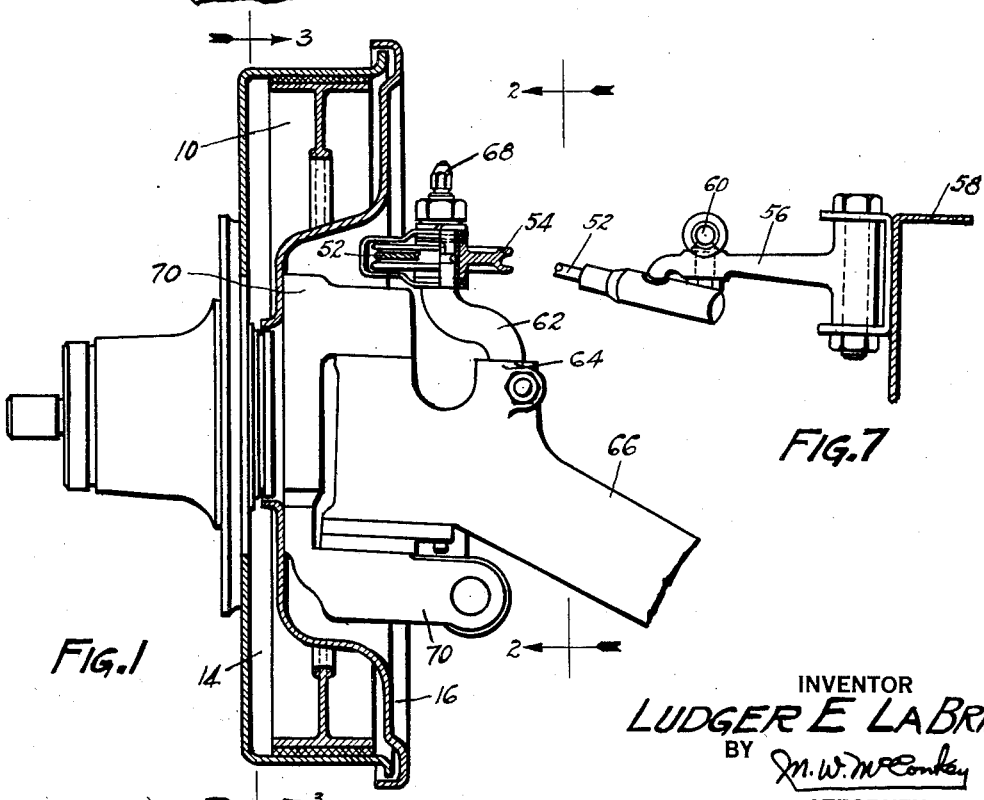
INVENTOR
LUDGER E. LA BRIE
BY
M. W. McConkey
ATTORNEY INVENTOR
LUDGER E. LA BRIE
BY
M. W. McConkey
ATTORNEY April 21, 1931.                L. E. LA BRIE                1,801,748
                              BRAKING SYSTEM
                    Filed Aug. 24, 1925        3 Sheets-Sheet 3
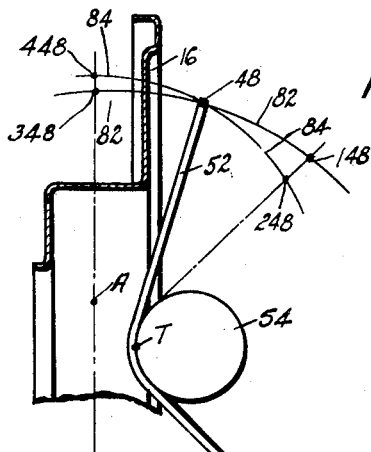
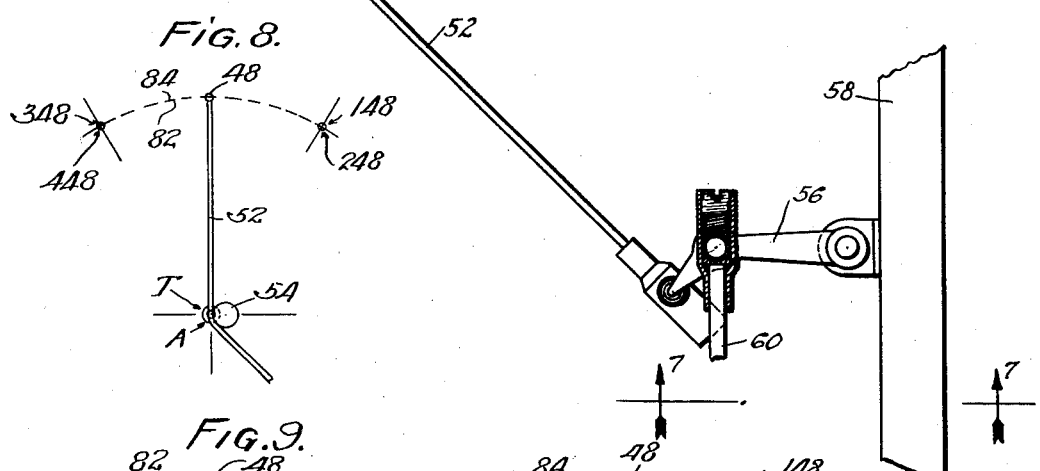
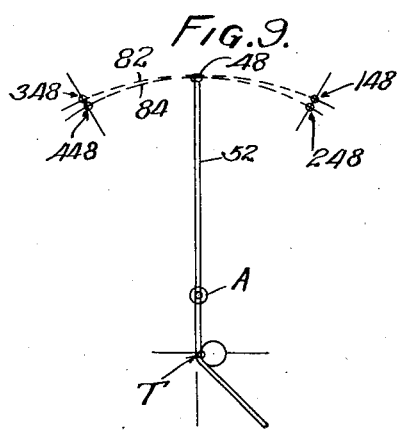
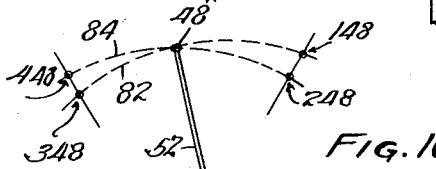
INVENTOR
LUDGER E. LA BRIE
BY
ATTORNEY Patented Apr. 21, 1931

1,801,748

UNITED STATES PATENT OFFICE

LUDGER ELIZÉ LA BRIE, OF SOUTH BEND, INDIANA, ASSIGNOR TO BENDIX BRAKE COMPANY, OF SOUTH BEND, INDIANA, A CORPORATION OF ILLINOIS

BRAKING SYSTEM

Application filed August 24, 1925. Serial No. 51,954.

This invention relates to brakes, and is illustrated as embodied in a front wheel automobile brake operated by a flexible tension element such as a cable.

Various features of the invention relate to improvements in the connections and guides for such a tension element, especially in an arrangement of the various parts so that the pressure on the brake is varied when the wheel is swivelled, preferably in such a manner as to slacken off on the cable when the wheel is on the outside of the turn. In one desirable arrangement a novel guide adjacent the swivelling axis is so arranged that the brake-applying device operated by the tension element is swung, by swivelling the wheel to place it on the outside of a turn, toward the guide to relieve the tension.

Other features of the invention relate to a novel movable bracket for the brake-applying cam or other device, permitting it to shift, preferably by providing the bracket with pairs of arms slidably embracing fixed guides. This is especially of utility in applying a floating friction device which anchors at one end when the drum is turning in one direction and at the other end when the drum is turning in the opposite direction.

An important minor feature of the invention relates to arranging the shift of the brake-applying device substantially at right angles to the cable or the like, so that the shifting does not sensibly affect the brake.

Other objects and features of the invention, including various novel combinations of parts and desirable particular constructions, will be apparent from the following description of one illustrative embodiment shown in the accompanying drawings, in which:

Fig. 1 is a vertical section through one front brake and associated parts;

Fig. 2 is a vertical section on the line 2—2 of Fig. 1, looking outwardly at the brake;

Fig. 6 is a diagram corresponding to a top plan view, and illustrating the release of the outer brake on a turn;

Fig. 7 is a section on the line 7—7 of Fig. 6, showing the chassis-supported cable-operating lever in rear elevation; and Figures 8, 9, and 10 are diagrams of various cable arrangements, corresponding generally to Figure 6.

Figure 3:
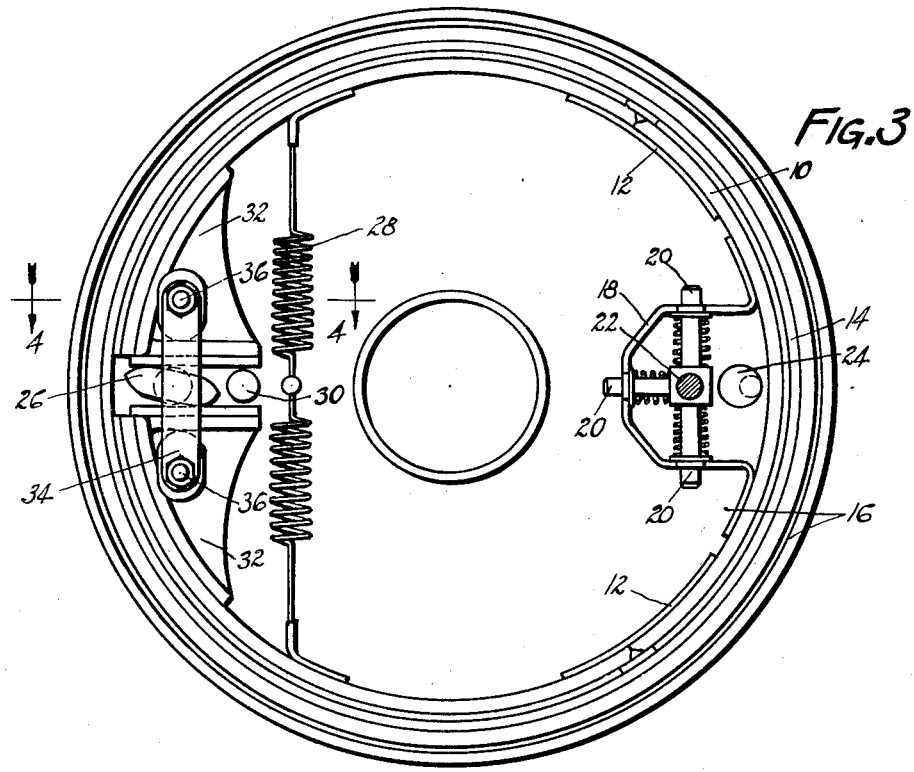
Fig. 3 is a vertical section through the brake on the line 3—3 of Fig. 1.
Figure 5:
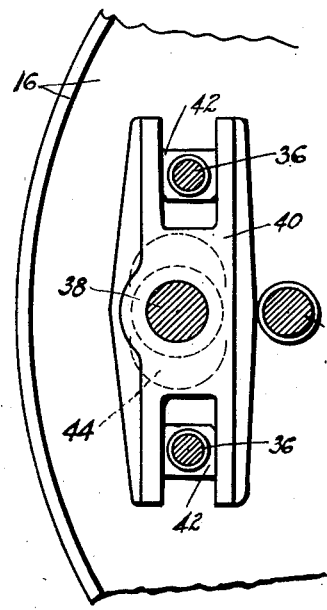
Fig. 5 is a vertical section on the line 5—5 of Fig. 4, showing the shiftable bracket.

The particular brake selected for illustration includes a friction device or band 10, in the form of three semi-flexible segments connected by leaf springs 12, and engageable with a drum 14 and inclosed between the drum and a backing plate 16. The central segment of the band 10 carries a loop 18, through the three sides of which project arms 20 carried by a stationary member 22, mounted on the backing plate. Movement of the friction device away from the drum is limited by an adjustable eccentric stop 24.

Figure 4:
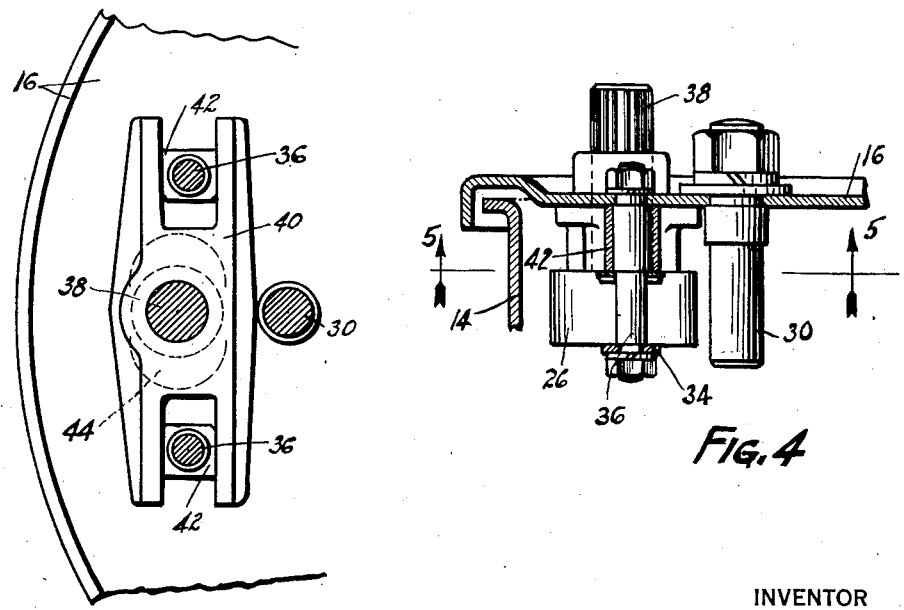
Fig. 4 is a partial horizontal section on the line 4—4 of Fig. 3, with the brake band removed, and showing the brake anchor in top plan.

The friction device 10 is expanded, to apply the brake, by suitable means such as a double cam 26, against the resistance of a return spring 28. According to the direction of rotation of the drum, the braking torque is taken by an anchor 30 from one or the other of two thrust members 32 secured to the opposite ends of the friction device. These ends are positioned laterally by a plate 34 crossing the end of cam 26, and carried by two posts or guides 36 secured to the backing plate (Fig. 4) and passing through slots in the thrust members 32.

Cam 26 is secured to, or integral with, a shaft 38 journalled in an H-shaped sliding bracket 40, having two pairs of arms, each pair slidably embracing a squared sleeve 42 on one of the guides 36. Shaft 38 passes through a relatively large opening 44 in the backing plate. This arrangement permits shifting of the bracket and cam as one end or the other of friction device 10 seats against anchor 30.

On the serrated end of shaft 38 is adjustably clamped an operating arm 46, having at its upper end a spherical socket receiving the ball-shaped base of a nut 48 adjustably threaded on a part 50 forming the end of a cable or equivalent flexible tension element 52.

Cable 52 passes around a pulley 54 to a ball-and-socket joint with an operating bell-crank idler lever 56 pivoted on the spring-supported chassis frame 58, lever 56 having a ball-and-socket joint with a brake rod 60 leading to a pedal-operated rockshaft or other suitable brake-applying mechanism.

Pulley 54 is mounted on a bracket 62 clamped in a lug 64 of the front axle 66, a lubricant fitting 68 being provided if desired. The point of tangency of the front length of cable 52 with pulley 54 is approximately at the swivelling axis of the wheel,—i. e. the axis of the king-pin or the like connecting axle 66 and the knuckle 70, so that the application of the brake will not affect the swivelling of the wheel.

I prefer, however, that this point of tangency be not exactly in the swivelling axis, but so arranged that the pressure on the brake is automatically relieved by swivelling the wheel to place it on the outside of the turn. When this is desired, the two front brakes are not equalized, and the point of tangency "T", as shown in the diagram of Fig. 6, is arranged behind the swivelling axis "A" and on the opposite side of the swivelling axis from the wheel.

If the swivelling axis was at the point "T", as in Fig. 8, joint 48 would be swung along an arc 82 about a center in the axis. Except for a slight wrapping of the cable about the pulley, so small in its effect in such a short arc that it may be neglected, the swivelling of the wheel to move joint 48 along arc 82 would not affect the pressure on the brake. When the wheel was on the outside of the turn, the joint would be at some position 148, and when the wheel was on the inside of the turn the joint would be at some position 348.

If the point of tangency "T" were placed behind "A" in a line passing through "A" and through the normal position of joint 48, as in Figure 9, swivelling the wheel in either direction, moving joint 48 about a center in axis "A", would cause it to come slightly closer to point "T", thus slackening off on the cable and relieving the pressure on the brake. The relief, however, would not be great in any ordinary angle, the distance AT being quite small compared to the distance T—48 (Fig. 6 being on an exaggerated and distorted scale, for convenience of illustration).

If the distance AT were at right angles to A—48, on the other hand, as in Figure 10, there would be more relief of the pressure on the outer brake, but (except as one wheel swivels a few degrees further than the other in an ordinary automobile) there would be an equal increase in pressure on the inner brake, which is not entirely desirable.

I prefer to adopt the compromise intermediate position shown, with "T" behind and inside the swivelling axis "A". This causes movement of joint 48 along an arc 84, having its center in the axis "A". When the wheel is on the outside of the turn the joint is at 248, and the cable is slackened in an amount represented by the distance 148—248. When the wheel is on the inside of the turn, the joint is at 448, and the tension on the cable is slightly increased in an amount represented by the distance 348—448, this being substantially less than the corresponding relief in pressure on the outer brake.

It should also be noted that the joint 48 is shifted, by the anchoring of friction device 10 at one end or the other, substantially at right angles to cable 52. In such a short distance the arc and its chord may be regarded as coincident, and therefore such shifting does not affect the pressure on the brake.

While one illustrative embodiment has been described in detail, it is not my intention to limit the scope of the invention to that particular embodiment, or otherwise than by the terms of the appended claims.

I claim:

1. A vehicle having a swivelled wheel with a brake, and comprising, in combination therewith, a brake-applying device swivelling with the wheel, an operating cable connected to said device, and a guide engaging the cable and so arranged that when the wheel is swivelled to place it on the outside of a turn the brake-applying device swings on an arc approaching the guide, to slacken off on the cable.

2. A vehicle having a swivelled wheel with a brake, and comprising, in combination therewith, a brake-applying device swivelling with the wheel, an operating cable connected to said device, and a direction-changing guide for the cable so arranged with respect to the swivelling axis that the brake-applying device is moved, by swivelling the wheel to place it on the outside of a turn, on an arc approaching the guide, to slacken off on the cable.

3. A vehicle having a swivelled wheel with a brake, and comprising, in combination therewith, a brake-applying device swivelling with the wheel, an operating cable connected to said device, and a guiding pulley for the cable so arranged with respect to the swivelling axis that the brake-applying device is moved, by swivelling the wheel to place it on the outside of a turn, on an arc approaching the pulley, to slacken off on the cable.

4. A vehicle having a swivelled wheel with a brake, and comprising, in combination therewith, a brake-applying device swivelling with the wheel, an operating cable connected to said device, and a guide which does not swivel with the wheel and which engages the cable and changes its direction at a point on the opposite side of the swivelling axis from the wheel.

5. A vehicle having a swivelled wheel with a brake, and comprising, in combination therewith, a brake-applying device swivelling with the wheel and arranged in front of the swivelling axis, an operating cable extending forwardly and connected to said device, and a guide which does not swivel with the wheel and which engages the cable and changes its direction at a point behind the swivelling axis.

6. A vehicle having a swivelled wheel with a brake drum, and comprising, in combination therewith, a floating friction device engageable with the drum and anchoring at one end when the drum is turning in one direction and at the other end when the drum is turning in the opposite direction, a brake-applying device shiftable with the friction device according to the direction of rotation of the drum, an operating cable connected to said device, and a guide for the cable substantially at the swivelling axis of the wheel, the brake-applying device shifting substantially at right angles to the cable so that the shifting has no substantial effect on the tension of the cable.

7. A vehicle having a wheel with a brake drum, and comprising in combination therewith, a floating friction device engageable with the drum and anchoring at one end when the drum is turning in one direction and at the other end when the drum is turning in the opposite direction, a brake-applying device shiftable with the friction device according to the direction of rotation of the drum, and an operating cable connected to said device, the brake-applying device shifting substantially at right angles to the cable so that the shifting has no substantial effect on the tension of the cable.

8. A vehicle having a spring-supported chassis frame and a wheel with a brake, and comprising, in combination therewith, a brake-applying device, an operating cable connected to said device, a lever pivotally mounted on the frame, a driver-operated tension element, and universal joints between the lever and the cable and between the lever and the tension element.

9. Brake mechanism including a rotatable drum and retarding means associated therewith, and comprising, in combinaiton therewith, a brake-applying shaft shiftable in a straight line along a chord of the drum, and operating means for rocking said shaft and transmitting brake-applying force thereto in a direction substantially at right angles to the direction of shifting, so that there is no tendency for said force to shift said shaft.

10. Brake mechanism including a rotatable drum and retarding means associated therewith, and comprising, in combination therewith, a brake-applying shaft, a support in which the shaft is journalled and which is constrained to shift with the shaft in a straight line along a chord of the drum to allow the shaft to balance itself in applying the brake, and brake-applying means for rocking the shaft and arranged to exert a brake-applying force in a direction substantially at right angles to the direction the support shifts.

11. Brake mechanism including a rotatable drum and retarding means associated therewith, and comprising, in combination therewith, a brake-applying shaft, a support in which the shaft is journalled and which support is constrained, by means parallel with the shaft to shift with the shaft to allow the same to balance itself in applying the brake, a lever on the shaft extending generally in the direction said support is arranged to shift, and a brake-applying connection to said lever for rocking the shaft and extending in a direction substantially at right angles to the direction the support shifts.

12. A vehicle having a swivelled wheel with a brake, and comprising, in combination therewith, a brake-applying shaft at the side of the drum spaced from the swivelling axis of the wheel, a support for said shaft arranged to shift in a direction substantially paralleling said axis, and a brake-applying connection extending generally at right angles to said axis to the shaft and acting on the support substantially at right angles to the direction the support shifts.

13. A vehicle having a swivelled wheel with a brake, and comprising, in combination therewith, a brake-applying shaft at the side of the drum spaced from the swivelling axis of the wheel, a support for said shaft arranged to shift in a direction substantially perpendicular to the radius of the drum at that point, a lever on the shaft extending in a general way, at least when the brake is applied, parallel to the direction the support shifts, a brake-applying connection from the lever extending generally at right angles to said lever and acting on the support substantially at right angles to the direction the support shifts, and means at said axis permitting the operation of the connection without interfering with swivelling the wheel.

In testimony whereof I have hereunto signed my name.

LUDGER ELIZÉ LA BRIE.